Figures 1, 2:
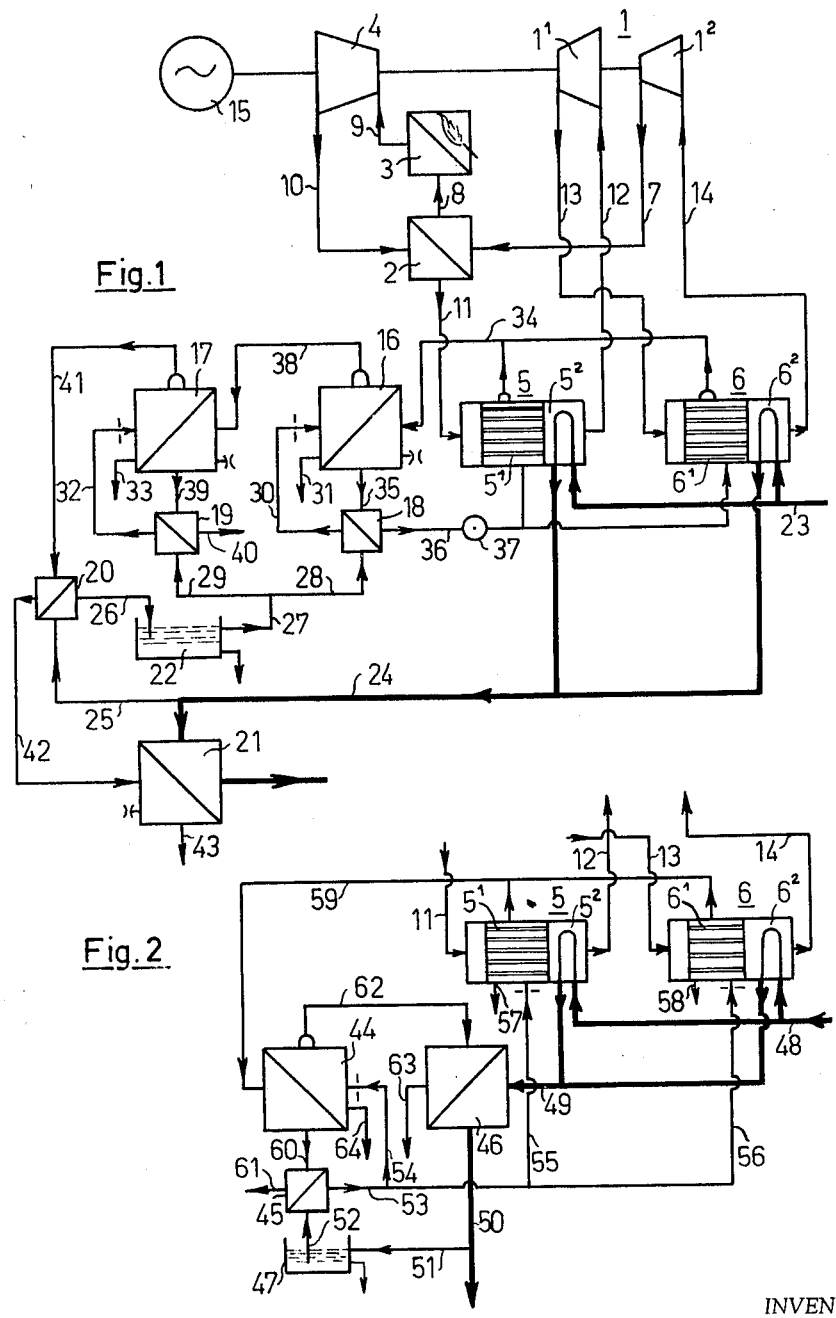

March 29, 1966  D. SCHMIDT  3,243,359
CLOSED-CIRCUIT THERMAL POWER PLANT WITH WASTE-HEAT UTILIZATION
IN A DISTILLATION PLANT
Filed Sept. 24, 1962

INVENTOR.
DAVID SCHMIDT
BY Dodge and Son
ATTORNEYS

United States Patent Office 3,243,359
Patented Mar. 29, 1966

3,243,359
CLOSED-CIRCUIT THERMAL POWER PLANT WITH WASTE-HEAT UTILIZATION IN A DISTILLATION PLANT
David Schmidt, Zurich, Switzerland, assignor to Escher Wyss Aktiengesellschaft, Zurich, Switzerland, a corporation of Switzerland
Filed Sept. 24, 1962, Ser. No. 225,781
Claims priority, application Switzerland, Oct. 6, 1961, 11,596/61
9 Claims. (Cl. 202—174)

This invention relates to a closed-circuit thermal power plant with circulation of a gaseous working medium and a distillation plant, utilizing waste heat given off by the working medium. The invention consists in that the waste heat is given off by the working medium in an evaporator, in which steam is generated at a pressure of less than 1 kg./cm.$^2$ abs., and a cooler, which is connected after said evaporator with respect to the working medium of the thermal power plant, and through which coolant flows without evaporation.

The object attained by this step is that the waste heat occurring in the thermal power plant partly at a temperature of below 100° C. can be utilized economically in the distillation plant.

Two embodiments of a plant according to the invention are represented in simplified form by way of example in the drawing, wherein:

FIG. 1 shows a plant in which an intermediate circuit of a heat-transmitting medium is provided for the transmission of heat from the working medium to the medium to be distilled, and FIG. 2 shows a plant with direct transmission of the waste heat of the thermal power plant to the medium to be distilled.

A closed-circuit thermal power plant with circulation of a gaseous working medium, preferably air, has according to FIG. 1 a compressor 1, comprising two parts $1^1$ and $1^2$ connected in series, a heat-exchanger 2, a heater 3, a turbine 4 and two waste heat receivers 5 and 6. The working medium compressed in the compressor 1 passes from the end stage of the compressor part $1^2$ through a pipe 7 to the heat-exchanger 2 and thence through a pipe 8 to the heater 3, in which it is heated by heat supplied externally by means of heat-exchanger partitions. The working medium thus heated passes through a pipe 9 to the turbine 4, in which it is expanded while doing work. The expanded working medium is then supplied through a pipe 10 to the heat-exchanger 2, in which it gives off heat to the compressed working medium entering through the pipe 7. The expanded working medium then passes through a pipe 11 to the waste heat receiver 5 and thence through a pipe 12 to the suction side of the compressor part $1^1$, thus closing the circuit. The waste heat receiver 6, which is connected by a pipe 13 to the pressure side of the compressor part $1^1$ and by a pipe 14 to the suction side of the compressor part $1^2$, serves as intermediate cooler for the working medium after partial compression in the compressor part $1^1$. The turbine 4 drives the compressor 1 and at the same time supplies useful power to an electric current generator 15.

Each of the waste heat receivers 5 and 6 consists of an evaporator $5^1$ and $6^1$, respectively, and a cooler $5^2$ and $6^2$, respectively, connected after said evaporator with respect to the working medium of the thermal power plant.

The waste heat given off by the working medium in the waste heat receivers 5 and 6 is utilized in a sea water distillation plant. According to FIG. 1, this distillation plant has two evaporators 16 and 17, three heat-exchangers 18, 19, 20, a condenser 21 and an open container 22.

The sea water is supplied to the plant through a pipe 23 and first passes as coolant through the two coolers $5^2$, $6^2$ of the waste heat receivers 5 and 6, without evaporating. The sea water preheated in this way is collected in a pipe 24 and for the greater part is supplied to the condenser 21 as coolant. The remaining, smaller part is intended for distillation and first of all passes through a pipe 25, branching off the pipe 24, into the heat-exchanger 20 and thence through a pipe 26 into the open container 22.

From the container 22, a pipe 27 branches into the two branches 28 and 29, the first of which leads part of the sea water to be distilled into the heat-exchanger 18, in which it is preheated. Thence, the sea water passes through a pipe 30 into the evaporator 16, in which it is for the greater part evaporated. The remaining, strongly concentrated brine solution is discharged through a pipe 31. The partial quantity of sea water to be distilled flowing through the branch 29 of the pipe 27 first enters the heat-exchanger 19 and then passes through a pipe 32 into the evaporator 17, in which again the greater part of the water introduced is evaporated, while the remaining concentrated brine solution is drawn off through a pipe 33.

An intermediate circuit for a heat transfer medium connects the evaporators $5^1$ and $6^1$ by means of a pipe 34 to the heating medium side of the evaporator 16. In the evaporators $5^1$ and $6^1$ steam at a pressure of less than 1 kg./cm.$^2$ abs. is generated in order to utilize as much as possible the heat content of the gaseous medium entering through the pipe 11. This steam is condensed in the evaporator 16, giving off heat to the sea water to be distilled. The resulting condensate first passes through a pipe 35 to the heat-exchanger 18, in which it preheats the sea water passing to the evaporator 16 through the pipes 28, 30 and is finally returned to the evaporators $5^1$, $6^1$ of the waste heat receivers 5, 6 through a pipe 36 with built-in pump 37. The use of such an intermediate circuit for the transmission of the waste heat from the working medium of the thermal power plant to the medium to be distilled, which intermediate circuit may be operated with pure water, prevents fouling and incrustation in the waste heat receivers 5 and 6.

For heating the evaporator 17, vapour of the evaporator 16 is supplied by a pipe 38 to the heating-medium side of evaporator 17. The evaporator 17 must then of course operate at a lower pressure than the evaporator 16. The condensate formed on the heating-medium side of the evaporator 17 is first supplied by a pipe 39 to the heat-exchanger 19 for preheating the sea water flowing through the latter and to the evaporator 17. It is thereupon discharged through a pipe 40 as desired end product of the distillation.

The vapour leaving the evaporator 17 through the pipe 41 first gives up heat in the heat-exchanger 20 to the sea water to be distilled and is finally supplied through a pipe 42 to the condenser 21 and is there completely precipitated. The resulting distilled water is discharged from the condenser 21 through a pipe 43. The condenser 21 of the last stage 17 of the distillation plant is connected on the coolant side after the coolers $5^2$ and $6^2$ of the working circuit.

In the plant shown in FIG. 2, no intermediate circuit is provided for the transmission of heat from the working medium to the sea water to be distilled. The evaporators $5^1$, $6^1$ of the waste heat receivers 5, 6 here, on the contrary, themselves form the first evaporation stage of the distillation plant. The latter furthermore comprises also an evaporator 44, a heat-exchanger 45, a condenser 46 and an open container 47.

Sea water, supplied by a pipe 48, is again first passed as coolant through the coolers $5^2$ and $6^2$ of the waste heat receivers 5 and 6 without evaporating. The condenser 46, with the supply pipe 49 and discharge pipe 50 is connected after the coolers $5^2$ and $6^2$ on the coolant side.

The sea water to be distilled is taken from the discharge pipe 50 by means of a branch pipe 51 and led to the open container 47. Thence it passes through a pipe 52, the heat-exchanger 45 and another pipe 53 with branches 54, 55, 56 on the one part to the evaporator 44 and on the other part to the evaporators $5^1$ and $6^1$ of the waste heat receivers 5 and 6.

These evaporators $5^1$ and $6^1$ operate at a pressure which is less than 1 kg./cm.$^2$ abs. Pipes 57 and 58 are for the discharge of the concentrated brine solution. The vapour formed is collected in a pipe 59 and is supplied to the evaporator 44 as heating steam. The resulting condensate (distilled water) passes through a pipe 60 to the heat-exchanger 45, where it gives up heat to the sea water to be distilled and is finally discharged through a pipe 61.

The evaporator 44, forming the last stage of the distillation plant must of course operate at a lower pressure than the evaporators $5^1$, $6^1$ of the waste heat receivers 5, 6. The vapour formed in the evaporator 44 is led to the condenser 46 through a pipe 62. Thence, the condensate is discharged through a pipe 63 as distillation end product. The concentrated brine is discharged from the evaporator 44 by a pipe 64.

If the thermal power plant is a closed-circuit air-turbine plant, the inlet air temperature may be 130° C. and 118° C. for example at the waste heat receivers 5 and 6, respectively, and the outlet temperature may be 35° C. A calculated example for the plant according to FIG. 1 gave the following data:

The sea water enters pipe 23 at 25° C. and is heated to 34° C. in the coolers $5^2$ and $6^2$. The evaporators 16 and 17 operate at 62° C. and 49° C., respectively. In the intermediate circuit, a pressure of 0.38 kg./cm.$^2$ abs. prevails in the evaporators $5^1$ and $6^1$ of the waste heat receivers 5, 6 and steam is supplied as heating steam at a temperature of 74° C. to the evaporator 16.

In the plant according to FIG. 2, for the same air temperatures in the evaporators $5^1$ and $6^1$ of the waste heat receivers 5 and 6, evaporation at a temperature of 75° C. was assumed, while in the evaporator 44 a temperature of 59° C. was assumed.

In the embodiment examples shown, the coolant for the coolers $5^2$ and $6^2$ of the waste heat receivers 5 and 6 and the condenser 21 of FIG. 1 or the condenser 46 of FIG. 2 has been assumed to be sea water, that is to say, the same medium as the medium to be distilled. Instead, however, some other medium, for example atmospheric air, could be used as coolant. Of course, the pipes 25 of FIG. 1 and 51 of FIG. 2 would then no longer branch off the pipes 24 and 50, respectively.

What is claimed is:

1. In combination a closed-circuit thermal power plant operating with a gaseous working medium, comprising compressing means, heating means and turbine means connected to be serially traversed by said working medium in the order stated; a distillation plant for evaporating liquid, means for the transfer of waste heat from the working medium of the thermal power plant to the liquid to be distilled, said last mentioned means comprising at least one evaporator, including a closed path for the passage of working medium flowing in said closed circuit power plant from the turbine means to the compressing means, and in which steam at a pressure of less than 1 kg./cm.$^2$ abs. is generated by said waste heat, the heat of said steam being transferred to the liquid to be distilled; a cooler connected to receive working medium from the closed path of said evaporator and a cooling medium passing through said cooler without being evaporated.

2. The combination defined in claim 1 in which the distillation plant comprises means to effect evaporation in stages and said evaporator is the first evaporation stage of the distillation plant.

3. The combination defined in claim 1 in which the distillation plant comprises at least one additional evaporator for the liquid to be distilled, a closed intermediate circuit disposed so as to lead said steam generated in the first-named evaporator as heating medium to said additional evaporator of the distillation plant and to return the resulting condensate to said first-named evaporator in which it is again evaporated.

4. The combination defined in claim 1 in which the distillation plant comprises means to effect evaporation in stages and a condenser disposed after the last evaporation stage, and in which flow connections are provided for leading the cooling medium having passed through said cooler to said condenser so that it serves as a coolant therein.

5. The combination defined in claim 1 in which the said cooling medium is air.

6. In combination a closed-circuit thermal power plant operating with a gaseous working medium; said circuit comprising compressing means and turbine means traversed serially by said working medium; a heater for the transfer of heat from outside to the working medium which flows from said compressing means to said turbine means; a heat exchanger for the transfer of heat from the working medium which flows from the turbine means to the compressing means to the working medium which flows from the compressing means to said heater; a cooler arranged to be traversed by the working medium which flows from said heat exchanger to the compressing means; a distillation plant having evaporation means for a liquid to be distilled comprising at least two evaporators of which one evaporator is inserted in the working medium circuit between said heat exchanger and said cooler so as to receive waste heat from the working medium; a condenser for the condensation of at least a part of the evaporated liquid; and means for leading the liquid to be distilled as a coolant first through said working medium cooler and then through said condenser before its being evaporated in said one evaporator.

7. The combination defined in claim 6 in which the compressing means comprise compression in stages and the distillation plant comprises at least one additional liquid evaporator arranged so as to receive heat from the working medium between said stages.

8. In combination a closed circuit thermal power plant operating with a gaseous working medium, said circuit comprising compressing means and turbine means traversed serially by said working medium; a heater for the transfer of heat from outside to the working medium which flows from said compressing means to said turbine means; a heat exchanger for the transfer of heat from the working medium which flows from the turbine means to the compressing means to the working medium which flows from the compressing means to said heater; a cooler arranged to be traversed by the working medium which flows from said heat exchanger to the compressing means; a distillation plant having evaporation means for a liquid to be distilled and a condenser for the condensation of at least a part of the evaporated liquid; an intermediate heat transfer circuit for the transfer of waste heat of the working medium to the evaporation means of the distillation plant including a heat transfer medium and at least one evaporator for said heat transfer medium inserted in said working medium circuit between said heat exchanger and said cooler so as to receive heat from the working medium; and means for leading the liquid to be distilled as a coolant first through said working medium cooler and then through said condenser before its being evaporated.

9. The combination defined in claim 8 in which the compressing means comprise compression in stages and the intermediate heat transfer circuit comprises at least one evaporator for the heat transfer medium arranged to receive heat from the working medium between said stages.

References Cited by the Examiner

UNITED STATES PATENTS

| | | | |
|---|---|---|---|
| 782,222 | 2/1905 | Cuthbert et al. | 60—95 |
| 2,203,731 | 6/1940 | Keller | 60—59 |
| 2,372,846 | 4/1945 | Nettel et al. | |
| 2,404,938 | 7/1946 | Armacost | 60—59 |
| 2,471,755 | 5/1949 | Karrer | 60—59 |
| 2,643,974 | 6/1953 | Impagliazzo. | |
| 2,748,599 | 6/1956 | Keller. | |
| 2,893,926 | 7/1959 | Worthen et al. | |
| 2,960,449 | 11/1960 | Williamson. | |

NORMAN YUDKOFF, *Primary Examiner.*

F. E. DRUMMOND, M. S. SILVERSTEIN,
*Assistant Examiners.*